United States Patent
Kim et al.

(10) Patent No.: US 8,582,759 B2
(45) Date of Patent: *Nov. 12, 2013

(54) METHOD AND APPARATUS FOR PROVIDING CONTENT SERVICE

(75) Inventors: Hyoung-shick Kim, Seoul (KR); Myung-soo Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,007

(22) Filed: Jul. 13, 2011

(65) Prior Publication Data

US 2011/0268267 A1    Nov. 3, 2011

Related U.S. Application Data

(63) Continuation of application No. 11/829,417, filed on Jul. 27, 2007, now Pat. No. 8,019,080.

(30) Foreign Application Priority Data

Sep. 19, 2006  (KR) .................. 10-2006-0090886

(51) Int. Cl.
*H04L 29/06* (2006.01)
*H04N 7/167* (2011.01)
*H04L 9/00* (2006.01)
*H04L 1/00* (2006.01)
*H04L 9/08* (2006.01)

(52) U.S. Cl.
USPC .............. 380/28; 380/40; 380/201; 380/210; 380/277; 380/281; 725/25; 725/63

(58) Field of Classification Search
None
See application file for complete search history.

(56) References Cited

U.S. PATENT DOCUMENTS

| | | | |
|---|---|---|---|
| 6,714,649 B1 * | 3/2004 | Masuda et al. ................. 380/44 |
| 7,099,479 B1 * | 8/2006 | Ishibashi et al. .............. 380/281 |
| 7,406,702 B2 * | 7/2008 | Hasegawa ....................... 725/25 |
| 7,567,674 B2 * | 7/2009 | Nishimoto et al. ........... 380/281 |
| 2003/0078795 A1 * | 4/2003 | Collier ............................... 705/1 |
| 2003/0200450 A1 | 10/2003 | England et al. |
| 2006/0062385 A1 * | 3/2006 | Wachtfogel et al. ......... 380/210 |

FOREIGN PATENT DOCUMENTS

| | | |
|---|---|---|
| CN | 1735192 A | 2/2006 |
| KR | 2001094548 A | 4/2001 |
| KR | 2003280522 A | 10/2003 |
| KR | 1020040083504 A | 10/2004 |
| KR | 1020060046028 A | 5/2006 |

* cited by examiner

*Primary Examiner* — Shin-Hon Chen
(74) *Attorney, Agent, or Firm* — Sughrue Mion, PLLC

(57) ABSTRACT

There is provided a method and apparatus for providing a content service. A method of providing a content service includes generating a plurality of pieces of decryption information according to a continuous period of using a broadcasting service with respect to predetermined contents, encrypting the contents, and decrypting the encrypted contents using the decryption information.

6 Claims, 5 Drawing Sheets

METHOD AND APPARATUS FOR PROVIDING CONTENT SERVICE

CROSS REFERENCE TO RELATED APPLICATION

This application is a continuation application of U.S. application Ser. No. 11/829,417 filed Jul. 27, 2007, which claims priority from Korean Patent Application No. 10-2006-0090886 filed on Sep. 19, 2006 in the Korean Intellectual Property Office, the entire disclosures of which applications are incorporated herein by reference in their entirety.

BACKGROUND OF THE INVENTION

1. Field of the Invention

Methods and apparatuses consistent with the present invention relate to providing a content service, and more particularly, to a method and apparatus for providing a content service, in which a subscriber, who uses the content service, decrypts encrypted contents using a plurality of pieces of decryption information, and is provided with the contents during a period of using the content service to which the subscriber subscribes.

2. Description of the Related Art

In general, a broadcast service is not transmitted directly to a specified receiver, that is, through "one to one" transmission, but the broadcast service is transmitted to N unspecified receivers, that is, through "one to N" transmission. A system has been used, such that a broadcast service subscriber (hereinafter, simply referred to as a "subscriber"), who has valid viewing authority to view the broadcasted contents, can only receive predetermined broadcast contents, and each digital broadcasting receiver determines whether the subscriber can receive the predetermined broadcast contents or not.

FIG. 1 is a conceptual diagram of how a broadcast service is provided according to the related art.

A broadcast service provider desires to only provide a broadcast service to a subscriber who has viewing authority to view contents of the broadcast service from the broadcast service provider, and the subscriber desires to receive the broadcast service during a period the subscriber desires.

To this end, an encryption system implemented by the broadcast service according to the related art includes a master key Km processing unit, a work key Kw processing unit, and a scramble key Ks processing unit. The scramble key Ks is used as a key that encrypts broadcast contents, and the work key Kw is generated so as to correspond to a period during which the subscriber uses the broadcast service according to a contract made between the subscriber and the broadcast service provider. Further, the master key Km is a unique key for each subscriber.

First, a process in a transmitter side 2 that provides the broadcast service will be described. The subscriber 1 communicates with the transmitter side 2 using an authentication protocol. When the authentication is successfully completed, the subscriber 1 acquires the master key Km from the transmitter side 2. The acquired master key Km is unique to each subscriber, and is stored in a predetermined storage area of a receiver side 4 that receives the broadcast service. Further, at this time, a work key Kw and a scramble key Ks are transmitted together to the subscriber.

In the next process, the transmitter side 2 encrypts the broadcast contents using the scramble key Ks, and the scramble key Ks is encrypted using the work key Kw. Further, the work key Kw and contract information of the subscriber 1 are encrypted using the master key Km, and transmitted to the receiver side 4.

Since the receiver side 4 has already received and stored the master key Km, the work key Kw, and the scramble key Ks from the transmitter side 2, the receiver side 4 performs decryption in reverse order from the order in which the broadcast contents have been encrypted at the transmitter side 2. That is, when receiving the encrypted broadcast contents, the receiver side 4 decrypts the work key Kw and the contract information using the stored master key Km, and decrypts the scramble key Ks using the stored work key Kw. Further, the receiver side 4 decrypts the encrypted broadcast contents using the scramble key Ks and accesses the broadcast contents.

However, according to the related art, when the broadcast service provider provides different periods during which the respective subscribers 1 use the broadcast service, the existing subscribers 1 need to update the keys (e.g., work key Kw) related to the broadcast service whenever another subscriber 1 makes a new contract with the broadcast service provider. Therefore, problems, such as the complexity of managing and maintaining the keys, and a corresponding increase in data exchange between the transmitter side 2 and the receiver side 4, are caused. The problems will be described in more detail with reference to FIG. 2.

FIG. 2 is a conceptual diagram of key distribution when a broadcast service is provided according to the related art.

As described above, the broadcast service provider encrypts the broadcast contents and only provides the encrypted broadcast contents to the authorized subscriber. Then, the subscriber decrypts the provided broadcast contents using the master key Km, the work key Kw, and the scramble key Ks, which are received when the subscriber makes a contract with the broadcast service provider on the broadcast service, and uses the decrypted broadcast contents.

For example, as shown in FIG. 2, a first subscriber C1 makes a contract with a broadcast service provider and desires to use a broadcast service during a first use period 12. Likewise, a second subscriber C2 makes a contract with the broadcast service provider and desires to use the broadcast service during a second use period 14, and a third subscriber C3 makes a contract with the broadcast service provider and desires to use the broadcast service during a third use period 16. The broadcast service provider makes the contract with the first subscriber on the broadcast service, encrypts a work key Kw, which is generated so as to correspond to the first use period 12, using a master key Km of the first subscriber, and provides the encrypted work key Kw. In addition, when the broadcast service provider makes the contract with the second subscriber on the broadcast service, the broadcast service provider encrypts a work key Kw, which is generated to correspond to the second use period 14, using a master key Km of the second subscriber, and provides the encrypted work key Kw. Thereafter, the broadcast contents are encrypted 11 every time unit 10 during the period of using the broadcast service, and transmitted to the subscribers. At this time, the scramble key Ks needs to be continuously updated every several seconds, and the work key Kw needs to be updated whenever a new subscriber subscribes to the broadcast service. As a result, as the number of subscribers increases, the number of keys that need to be distributed, maintained, and managed is also increased.

Further, when the broadcast contents are encrypted and provided to a receiver, the encrypted contents are decrypted by the receiver using the master key Km, the work key Kw, and the scramble key Ks of each of the subscribers. The decrypted broadcast contents are then provided to each of the subscribers of the broadcast service.

Meanwhile, when the subscribers C1 and C3 are provided with the broadcast service in the same broadcast service time unit 18, if the subscriber C3 cancels the contract on the broadcast service and secedes from the broadcast service, the broadcast service provider updates the keys of the subscriber C1. The broadcast service provider then provides the broadcast service such that the subscriber C3, who has seceded from the broadcast service, is not provided with the broadcast service any more. As such, according to the related art, when another existing subscriber secedes from the broadcast service or a new subscriber subscribes to the broadcast service so as to receive the broadcast service, the existing subscribers need to update the decryption keys in their possession, which causes inconvenience to the existing users.

Therefore, the complex distribution, management, and maintenance of the keys according to the related art in order to provide the broadcast service needs to be improved, and the broadcast service needs to be provided to a subscriber in a more efficient manner.

SUMMARY OF THE INVENTION

An aspect of the present invention is to provide a method and apparatus for providing a content service that allows a subscriber, who uses the content service, to decrypt encrypted contents using a plurality of pieces of decryption information and be provided with the contents during a period of using the content service to which the subscriber subscribes.

Aspects of the present invention are not limited to those mentioned above, and other aspects of the present invention will be apparently understood by those skilled in the art through the following description.

According to a first aspect of the present invention, there is a provided a method of providing a content service, the method including generating a plurality of pieces of decryption information corresponding to a continuous period of using a broadcast service with respect to predetermined contents, encrypting the contents, and decrypting the encrypted contents using the decryption information.

According to a second aspect of the present invention, there is a provided an apparatus for providing a content service, the apparatus including a generation unit generating a plurality of pieces of decryption information corresponding to a continuous period of using a service with respect to predetermined contents, an encryption unit encrypting the contents, and a decryption unit decrypting the encrypted contents using the decryption information.

According to a third aspect of the present invention, there is a provided an apparatus for providing a content service, the apparatus including a service encrypting part that includes a generation unit generating first decryption information in a forward direction starting from a start time of a continuous period of using a broadcast service with respect to predetermined contents, and second decryption information in a backward direction starting from a termination time of the continuous period of using the broadcast service, using one-direction hash functions, an encryption unit encrypting the contents using the one-direction hash functions that are used when generating the first decryption information and the second decryption information, and a first transceiver transmitting the encrypted contents, the first decryption information, and the second decryption information, and a service decrypting part that includes a second transceiver receiving the encrypted contents, and a decryption unit decrypting the encrypted contents, which are transmitted, using the first decryption information and the second decryption information. In this case, values of the first decryption information and the second decryption information are automatically changed during the continuous period of using the broadcast service, and the encrypted contents are decrypted according to the changed values.

BRIEF DESCRIPTION OF THE DRAWINGS

The above and other features of the present invention will become more apparent by describing in detail exemplary embodiments thereof with reference to the attached drawings in which.

DESCRIPTION OF THE EXEMPLARY EMBODIMENTS

Figure 1:
FIG. 1 is a conceptual diagram of how a broadcast service is provided according to the related art.
Figure 2:
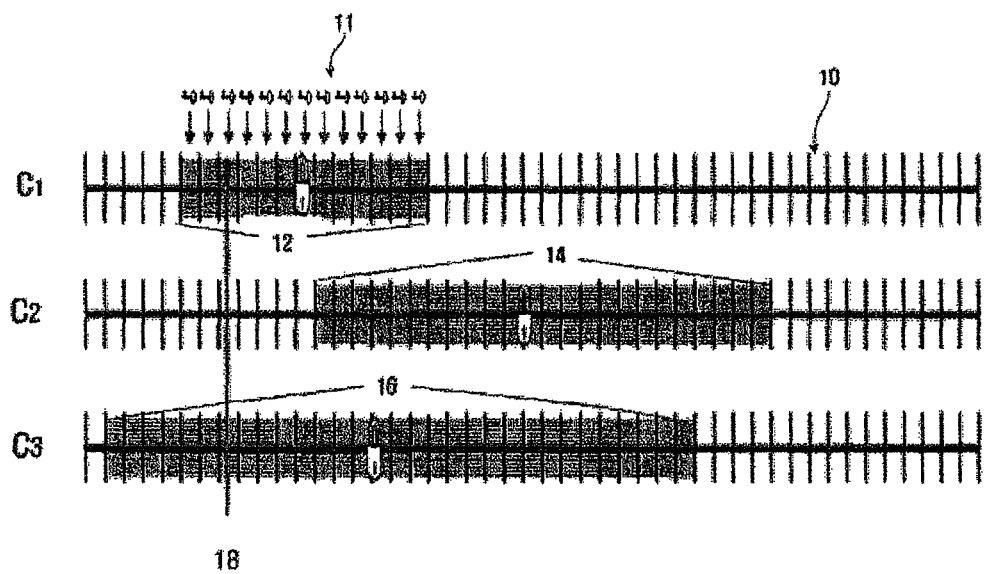
FIG. 2 is a conceptual diagram of key distribution when a broadcast service is provided according to the related art.

Features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to the accompanying drawings, in which exemplary embodiments of the invention are shown.

Figure 3:
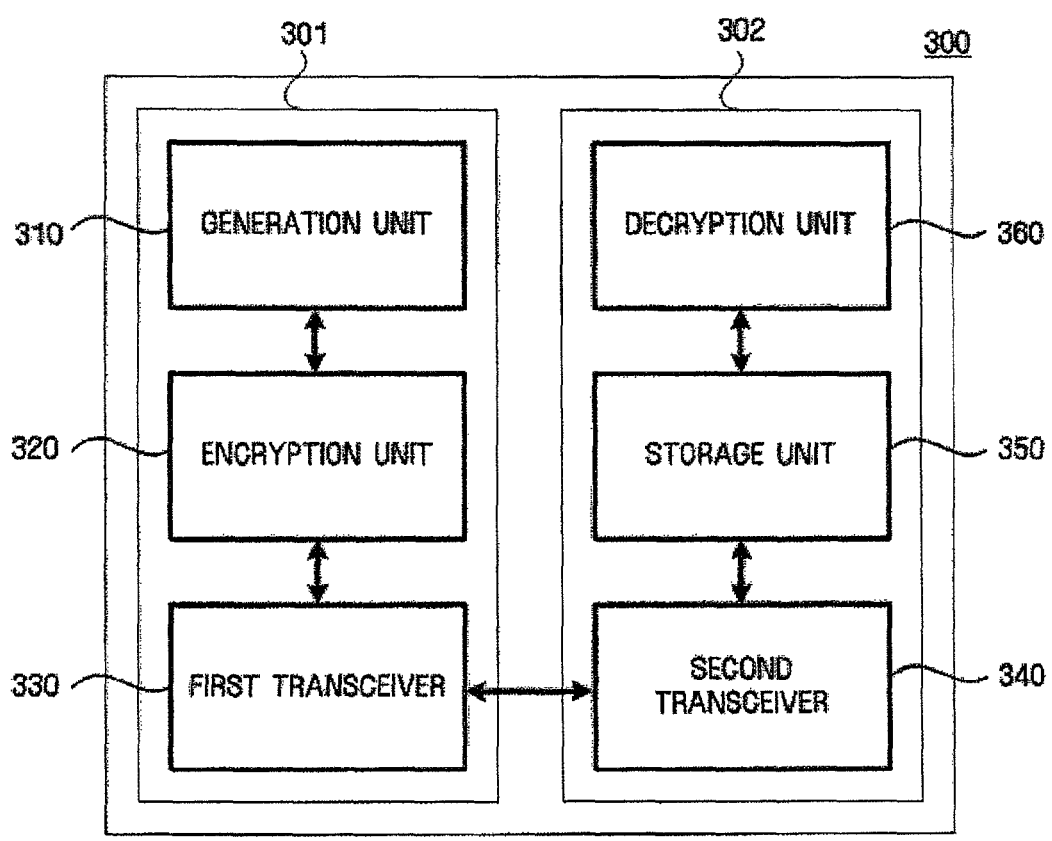
FIG. 3 is a block diagram of an apparatus for providing a content service according to an exemplary embodiment of the invention.

FIG. 3 is a block diagram of an apparatus for providing a content service according to an exemplary embodiment of the invention.

Hereinafter, in the exemplary embodiment, a description is made of a case in which a broadcast service is exemplified, but the invention is not limited thereto. The invention may be applied to content services that are provided to users in order of time or in succession.

An apparatus for providing a content service 300 includes a service encrypting part 301 and a service decrypting part 302. The service encrypting part 301 includes a generation unit 310, an encryption unit 320, and a first transceiver 330. The service decrypting part 302 includes a second transceiver 340, a storage unit 350, and a decryption unit 360. The service encrypting part 301 may be installed in a transmitter-side device that provides a broadcast service, and the service decrypting part 302 may be installed in a receiver-side device that receives the broadcast service.

First, the components of the service encrypting part 301 will be described.

The generation unit 310 generates a plurality of pieces of decryption information by which the encrypted broadcast contents corresponding to a continuous period of using the broadcast service, to which the subscriber subscribes, can be decrypted. The generated decryption information is transmitted by the first transceiver 330 to be described below, and stored in the storage unit 350. At this time, a one-direction hash function is used when generating the decryption information, and the decryption unit 360 to be described below can decrypt the encrypted broadcast contents corresponding to the period of using the broadcast service by the subscriber, using the decryption information. The decryption information may be transmitted once for the first time by the first transceiver 330. The encrypted broadcast contents are decrypted using the decryption information by the service decrypting part 302 during the continuous period of using the broadcast service to which each of the subscribers subscribes, and the decrypted broadcast contents are provided to each of the subscribers.

The decryption information may include first decryption information and second decryption information. The first decryption information is generated using a one-direction hash function in a forward direction starting from a start time of the continuous period of using the broadcast service. The second decryption information is generated using a one-direction hash function in a backward direction starting from a termination time of the continuous period of using the broadcast service. A value of the decryption information is automatically changed during the continuous period of using the broadcast service, and the encrypted contents are decrypted according to the changed value, such that the problem of the complex distribution of the keys in time units according to the related art can be solved.

Therefore, for example, when a subscriber A subscribes to a broadcast service for a predetermined continuous period from Ti to Tj of using the broadcast service, values of first and second decryption information are automatically changed for the period from the Ti to the Tj. As a result, the subscriber A can continuously receive the broadcast contents during the continuous period of using the broadcast service without receiving additional decryption information. The subscriber A cannot use the broadcast service any more when the corresponding period is terminated because each of the first and second decryption information is generated using the one-direction hash function so as to correspond to the continuous period of using the broadcast service.

The encryption unit 320 encrypts the broadcast contents that are provided to the subscriber. At this time, the broadcast contents may be encrypted using the one-direction hash function. A method of encrypting the broadcast contents will be described in detail with reference to FIG. 5.

The first transceiver 330 transmits the decryption information and the encrypted broadcast contents to the second transceiver 340.

The components of the service decrypting part 302 will now be described.

The second transceiver 340 stores the decryption information transmitted from first transceiver 330 in the storage unit 350, and transmits the encrypted broadcast contents to the decryption unit 360.

The storage unit 350 stores the decryption information and other various types of data.

The decryption unit 360 receives the encrypted broadcast contents by the second transceiver 340. Further, the decryption unit 360 decrypts the broadcast contents that are encrypted according to the usage period of the broadcast service, to which the subscriber subscribes, using the decryption information stored in the storage unit 350. Since the encrypted broadcast contents are generated using the one-direction hash function that has been used when generating the decryption information, the broadcast contents that are encrypted according to the usage period of the broadcast service, to which the subscriber subscribes, can be decrypted using the decryption information stored in the storage unit 350.

Each of the components shown in FIG. 3 may be composed of a kind of "module". The term "module" means software, or a hardware component such as an FPGA (Field Programmable Gate Array) or an ASIC (Application Specific Integrated Circuit) and the modules each perform allocated functions. However, the modules are not limited to software or hardware. The modules may be configured in an addressable storage medium, or may be configured to run on at least one processor. Therefore, as an example, the modules include: components such as software components, object-oriented software components, class components, and task components; processors, functions, attributes, procedures, sub-routines, segments of program codes, drivers, firmware, micro-codes, circuits, data, databases, data structures, tables, arrays, and variables. The functions provided by the components and the modules may be combined into fewer components and or modules may be separated into additional components and modules.

Figure 4:
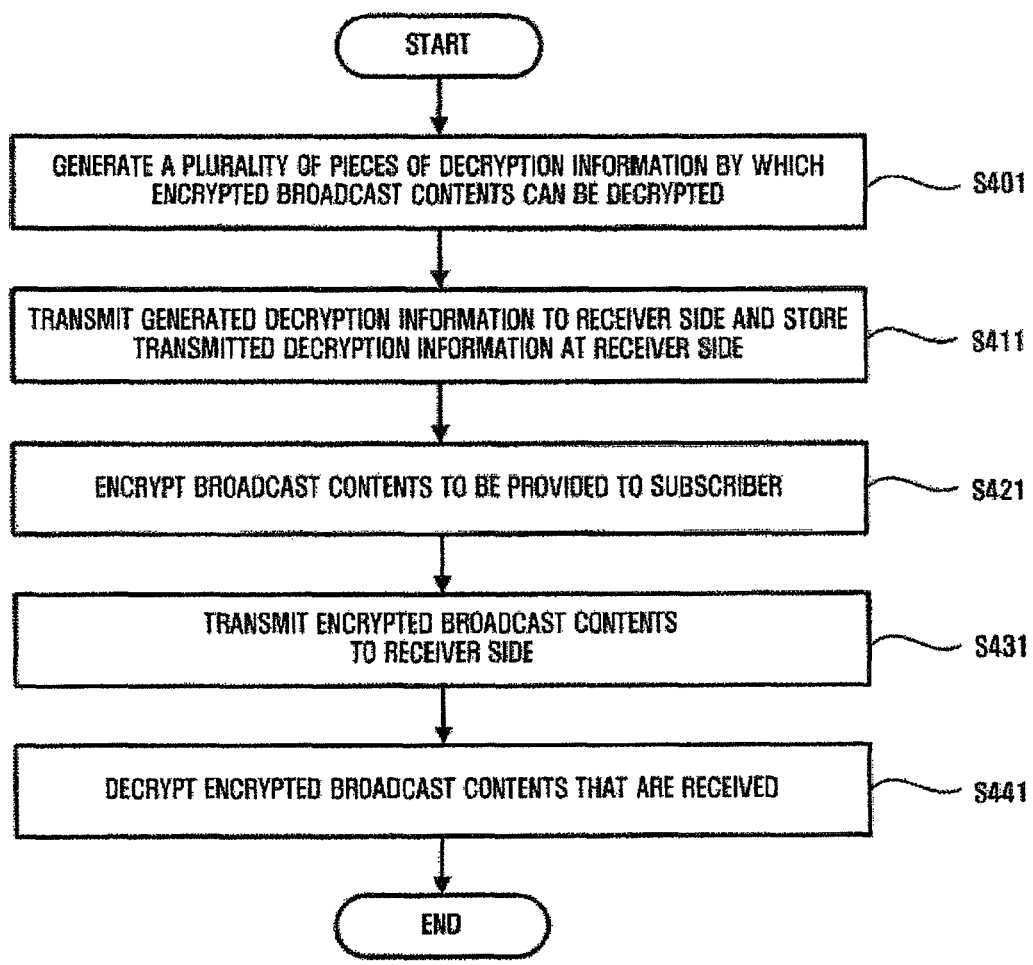
FIG. 4 is a flow chart illustrating a method of providing a content service according to an exemplary embodiment of the invention.

FIG. 4 is a flowchart illustrating a method of providing a content service according to an exemplary embodiment of the invention.

The generation unit 310 generates a plurality of pieces of decryption information corresponding to the continuous period of using the broadcast service to which the subscriber subscribes (S401). At this time, the decryption information is generated using the one-direction hash function, including first and second decryption information. Values of the first and second decryption information are automatically changed during the continuous period of using the broadcast service.

In the next process, the first transceiver 330 transmits the generated decryption information to the second transceiver 340, and the received decryption information is stored in the storage unit 350 (S411).

The encryption unit 320 encrypts the broadcast contents to be provided to the subscriber (S421). At this time, the broadcast contents may be encrypted using the one-direction hash function. Therefore, when the encrypted broadcast contents are transmitted to the receiver side, the encrypted broadcast contents may be decrypted using the decryption information according to the continuous period of using the broadcast service to which the subscriber subscribes. Further, when there are a plurality of subscribers, each of the subscribers can be provided with the broadcast contents, which are decrypted according to the period of using the broadcast service of each of the subscribers, for the continuous period of using the broadcast service.

In the next process, the first transceiver 330 transmits the encrypted broadcast contents to the second transceiver 340 (S431).

The decryption unit 360 receives the encrypted broadcast contents by the second transceiver 340, and decrypts the encrypted broadcast contents, which are encrypted according to the period of using the broadcast service to which the user subscribes, using the decryption information stored in the storage unit 350 (S441).

Figure 5:
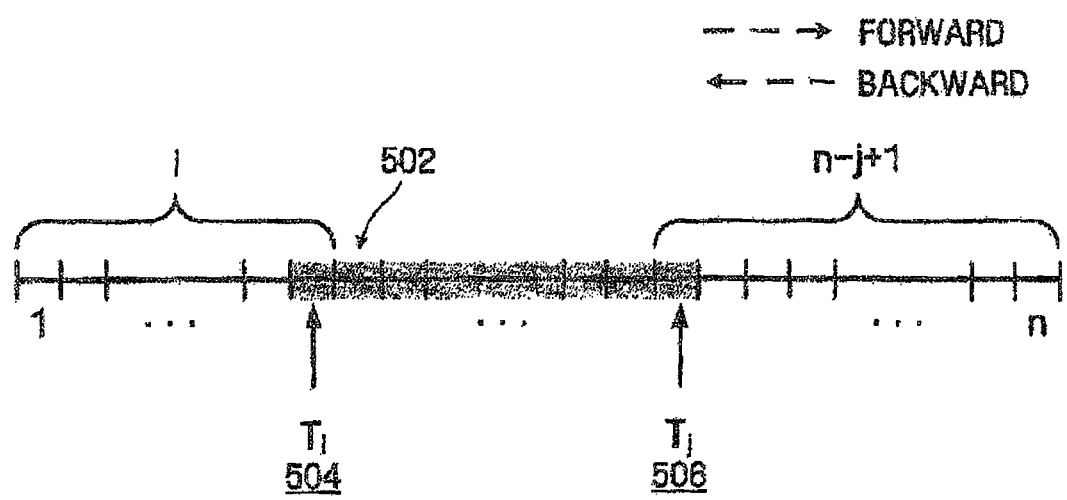
FIG. 5 is a view showing an example in which a broadcast service is provided according to an exemplary embodiment of the invention.

FIG. 5 is a view showing an example in which a broadcast service is provided according to an exemplary embodiment of the invention. As shown in FIG. 5, the usage period during which the broadcast service is provided is expressed in a plurality of time units 502 in order of time in one direction, that is, in a left-to-right direction. In FIG. 5, n time units 502 are shown.

For example, the subscriber makes a contract with the broadcast service provider, and desires to be provided with the broadcast service during a continuous period of using the broadcast service from a start point Ti 504 of the broadcast service to a termination point Tj 506 of the broadcast service.

First, an operation of the transmitter side that provides the broadcast service will be described.

The generation unit 310 generates first decryption information corresponding to the time Ti 504 and the second decryption information corresponding to the time Tj 506. Each of the first and second decryption information is used when decrypting the encrypted broadcast contents.

Specifically, the first decryption information corresponding to the time Ti 504 may be represented in Equation 1.

$$\text{first decryption information} = H_F^i(S_F) \quad \text{[Equation 1]}$$

In Equation 1, $H_F$ indicates a first one-direction hash function, and $S_F$ indicates a first random number value. Here, the one-direction hash function means a function that may not perform the inverse transformation on the original message. Further, the $S_F$ may be a secret value that the broadcast service provider only knows. Therefore, it can be understood that when the value i increases, the first decryption information is generated in a forward direction.

Further, the second decryption information corresponding to the time Tj 506 may be represented in Equation 2.

$$\text{second decryption information} = H_B^{n-j+1}(S_B) \quad \text{[Equation 2]}$$

In Equation 2, $H_B$ indicates a second one-direction hash function and $S_B$ indicates a second random number value. At this time, when a value j increases, the second decryption information is generated in a backward direction.

Therefore, the subscriber can be provided with the broadcast service using the first and second decryption information for the continuous period of using the broadcast service from the time Ti 504 to the time Tj 506.

At this time, each of the first and second decryption information is transmitted to the subscriber once for the first time, and values of the first and second decryption information are automatically changed during the continuous period of using the broadcast service. Therefore, the encrypted contents that are received are decrypted according to the changed values. The problem of the complex distribution of encryption keys, which are generated in every time unit 502, to the subscriber according to the related art can be solved.

In the next process, the encryption unit 320 encrypts the broadcast contents and transmits the encrypted broadcast contents to the subscriber by the first transceiver 330. At this time, preferably, the broadcast contents may be encrypted, as represented in Equation 3.

$$\text{encrypted broadcast contents} = C(H_F^i(S_F), H_B^{n-j+1}(S_B)) \quad \text{[Equation 3]}$$

In Equation 3, C indicates a composite operator, and in one exemplary embodiment, the C may be an XOR operator. $S_F$ and $S_B$ may be secret values that are known only to the broadcast service provider. Therefore, the broadcast service provider can commonly provide the encrypted broadcast contents to all of the subscribers.

Next, an operation of the receiver side that is provided with the broadcast service will be described.

The decryption unit 360 decrypts the encrypted broadcast contents corresponding to the period of using the broadcast service of the subscriber, using the first and second decryption information transmitted from the first transceiver 330. Therefore, the subscriber can use the corresponding broadcast contents during the period of using the broadcast service of the subscriber.

At this time, since the values of the first and second decryption information are automatically changed during the continuous period of using the broadcast service, the subscriber can continuously be provided with the broadcast contents during the period of using the broadcast service. When the period of using the broadcast service is terminated, the broadcast service is automatically stopped. That is, each subscriber receives the first and second decryption information generated using the one-direction hash functions, and the subscriber can continuously be provided with the broadcast contents during the period of using the broadcast service (i.e., period of time from the time Ti 504 to the time Tj 506) of the user.

As such, when the subscriber receives the first and second decryption information corresponding to the continuous period of using the broadcast service to which the subscriber subscribes, the subscriber can be provided with the broadcast contents using two pieces of decryption information during the period of using the broadcast service to which the subscriber subscribes. Further, even when the number of new subscribers increases, the existing subscriber can continuously be provided with the broadcast service during the period of using the broadcast service of the subscriber, using the first and second decryption information provided once for the first time. Therefore, the problem of updating the decryption information of the existing subscriber whenever another existing subscriber secedes from the broadcast service or a new subscriber subscribes to the broadcast service according to the related art can be solved.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to the method and apparatus for providing a content service of the invention, the following effects can be obtained.

First, since the subscriber that subscribes to the content service can be provided with the contents using two pieces of decryption information during the period of using the content service to which the subscriber subscribes, the problem of the complex distribution of keys occurring when providing the content service can be solved.

Second, after the decryption information is transmitted to the subscriber once for the first time, the value of the decryption information is automatically changed during the continuous period of using the content service. Therefore, the complex retransmission, maintenance, and management of the keys according to the related art can be simplified.

Third, since the decryption information is generated using the one-direction hash function so as to correspond to the period of using the content service to which the subscriber subscribes, the problem of inefficiency of updating the keys of the existing subscriber whenever a new subscriber subscribes to the content service according to the related art can be solved, and each subscriber can be provided with the content service using the decryption information of the subscriber during the period of using the content service of the subscriber.

What is claimed is:

1. A method of providing a content service, the method comprising:
   generating a plurality of pieces of decryption information corresponding to a continuous period of using a service with respect to predetermined contents;
   encrypting the contents; and
   transmitting the plurality of pieces of decryption information and the encrypted contents,
   wherein the encrypted contents are generated using a function, wherein the plurality of pieces of the decryption information are also generated using the function, and a value of the plurality of pieces of the decryption information is changed during the continuous period of using the service after transmission of the plurality of pieces of the decryption information.

2. The method of claim 1, wherein the encrypted contents and the plurality of pieces of the decryption information are commonly provided to the subscribers of the content service, wherein the encrypted contents that are commonly provided to the subscribers are decrypted using the plurality of pieces of the decryption information of each of the subscribers so as to correspond to the continuous period of using the service of each of the subscribers.

3. An apparatus for providing a content service, the apparatus comprising:
   a generation unit which generates a plurality of pieces of decryption information corresponding to a continuous period of using a service with respect to predetermined contents;
   an encryption unit which encrypts the contents; and
   a first transceiver which transmits the plurality of pieces of decryption information and the encrypted contents,
   wherein the encrypted contents are generated using a function, wherein the plurality of pieces of the decryption information are also generated using the function, and a value of the plurality of pieces of the decryption information is changed during the continuous period of using the service after transmission of the plurality of pieces of the decryption information.

4. The apparatus of claim 3, wherein the encrypted contents and the plurality of pieces of the decryption information are commonly provided to subscribers who subscribe to the content service, wherein the encrypted contents that are commonly provided to the subscribers are decrypted using a plurality of pieces of the decryption information of each of the subscribers so as to correspond to a continuous period of using the service of each of the subscribers.

5. A method of providing a content service, the method comprising:
   receiving a plurality of pieces of decryption information corresponding to a continuous period of using a service with respect to predetermined contents and encrypted contents; and
   decrypting the encrypted contents using the plurality of pieces of the decryption information,
   wherein the encrypted contents are generated using a function, wherein the plurality of pieces of the decryption information are also generated using the function, and a value of the plurality of pieces of the decryption information is changed during the continuous period of using the service after transmission of the plurality of pieces of the decryption information.

6. An apparatus for providing a content service, the apparatus comprising:
   a second transceiver which receives a plurality of pieces of decryption information corresponding to a continuous period of using a service with respect to predetermined contents and encrypted contents; and
   a decryption unit which decrypts the encrypted contents using the plurality of pieces of the decryption information,
   wherein the encrypted contents are generated using a function, wherein the plurality of pieces of the decryption information are also generated using the function, and a value of the plurality of pieces of the decryption information is changed during the continuous period of using the service after transmission of the plurality of pieces of the decryption information.

* * * * *

UNITED STATES PATENT AND TRADEMARK OFFICE
Certificate

Patent No. 8,582,759 B2      Patented: November 12, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Hyoung-shick Kim, Seoul (KR); Myung-soo Chang, Seoul (KR); and Sang-hyeon, Seoul (KR).

Signed and Sealed this Thirtieth Day of September 2014.

CORDELIA P. K. ZECHER
*Supervisory Patent Examiner*
Art Unit 2431
Technology Center 2400